United States Patent
Tanaka et al.

(10) Patent No.: US 6,239,051 B1
(45) Date of Patent: May 29, 2001

(54) MAGNESIA-SPINEL REFRACTORY AND METHOD OF PRODUCING THE SAME

(75) Inventors: Fumito Tanaka; Hideya Sato, both of Omiya; Susumu Okabe, Kagawa-ken; Masaharu Yamada, Omiya, all of (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/493,017

(22) Filed: Jan. 28, 2000

(30) Foreign Application Priority Data

Jan. 29, 1999 (JP) .................................. 11-023203
Jan. 7, 2000 (JP) .................................. 12-001359

(51) Int. Cl.$^7$ .............................. C04B 35/04; C04B 35/10
(52) U.S. Cl. .............................................................. 501/120
(58) Field of Search ............................................. 501/120

(56) References Cited

U.S. PATENT DOCUMENTS

| | | | | |
|---|---|---|---|---|
| 3,342,616 | * | 9/1967 | Alper et al. | 106/59 |
| 4,126,479 | * | 11/1978 | Videtto | 106/62 |
| 4,703,022 | * | 10/1987 | Johnson | 501/95 |
| 4,780,434 | * | 10/1988 | Watanabe et al. | 501/120 |
| 5,492,871 | * | 2/1996 | Van Zyl et al. | 501/120 |
| 5,707,910 | * | 1/1998 | Kamiyanagi et al. | 501/120 |

* cited by examiner

*Primary Examiner*—Elizabeth D. Wood
(74) *Attorney, Agent, or Firm*—Oblon, Spivak, McClelland, Maier & Neustadt, P.C.

(57) ABSTRACT

The present invention provides a magnesia-spinel refractory in which corrosion resistance and slag penetration resistance are significantly improved. The magnesia-spinel refractory is obtained by mixing magnesia granulated powder having a particle diameter of 10 to 150 μm and alumina powder having a particle diameter of 0.1 to 5 μm, molding the resultant mixture, and then burning the molded product to form a dense and strong combined structure of periclase and spinel. The mixture of magnesia and alumina contains powders of both components, or a powder of one of the components and a granulated powder of the other component. It is preferable to use a spray dryer method as granulating means, and a hydrostatic pressing method as molding means. These mixtures are used for producing magnesia-spinel protecting tube and crucible, bricks for copper smelting and converting furnaces, and magnesia-spinel protecting tube and crucible for copper smelting and converting furnace slag. In this case, the hydrostatic pressing method is used.

25 Claims, 3 Drawing Sheets

MAGNESIA-SPINEL REFRACTORY AND METHOD OF PRODUCING THE SAME

BACKGROUND OF THE INVENTION

1. Field of the Invention

The present invention relates to a magnesia-spinel refractory having improved corrosion resistance and slag penetration resistance and used for a high-temperature metallurgical furnace, a cement rotary kiln, and the like for steel refining, nonferrous metallurgy, etc.

2. Description of the Related Art

A conventional magnesia ultra-high-temperature refractory is disclosed, which comprises a fused magnesia clinker as an aggregate, and a spinel solid solution phase containing an alumina component in an amount of 5 to 40% by weight relative to the entire matrix (refer to, for example, Japanese Patent Unexamined Patent Publication No. 4-55360). Japanese Unexamined Patent Publication No. 5-117019 discloses that magnesia-chrome or magnesia-spinel basic refractory bricks (a type of ceramics) are mainly used for a high-temperature metallurgical furnace, a cement rotary kiln, or the like for steel refining, nonferrous metallurgy, etc, and the magnesia-spinel refractory bricks are generally produced by mixing two raw materials, i.e., 50 to 90% by weight of magnesia (MgO) clinker and 10 to 50% by weight of spinel ($MgO.Al_2O_3$) clinker.

However, in molding and burning a mixture of magnesia clinker powder and spinel clinker powder, the spinel phase is not sufficiently produced in the crystal grain boundaries of periclase crystals, which are magnesia crystals, and thus a magnesia-spinel refractory having a high density and a strong structure cannot be obtained. Furthermore, since a mixture containing magnesia clinker and spinel clinker a-powders each containing coarse particles (particle diameter of about 1 to 3 mm), medium particles (particle diameter of about 250 $\mu$m to 1 mm) and fine particles (particle diameter of 250 $\mu$m or less) is molded and burned, the apparent porosity of the resultant refractory is about 10% or more, thereby failing to obtain a dense structure. Therefore, the refractory has problems in that it is easily corroded with melted slag and melted cement, or easily worn by structural spalling and abrasion.

SUMMARY OF THE INVENTION

The inventors carried out various studies about the above problems of magnesia-spinel refractories used for a high-temperature metallurgical furnace, a cement rotary kiln, and the like for steel refining, nonferrous metallurgy, etc. As a result, it was found that at least a portion of raw materials comprises granulated powder granulated by a spray dryer method, and a hydrostatic pressing method is used as molding means to improve spalling resistance and significantly improve corrosion resistance and slag penetration resistance, leading to the achievement of the present invention. Accordingly, it is an object of the present invention to provide a magnesia-spinel refractory in which the corrosion resistance and slag penetration resistance are significantly improved.

The object of the present invention is achieved by the following construction.

A magnesia-spinel refractory comprises a burned product of alumina and magnesia, which has a crystal structure composed of periclase having closed pores and spinel comprising a $MgO.Al_2O_3$ component, wherein the periclase crystal grain boundaries have a spinel phase, and periclase and spinel form a dense and strong combined structure.

A magnesia-spinel refractory is obtained by mixing magnesia granulated powder and alumina powder, molding the resultant mixture, and then burning the molded product to form a dense and strong combined structure of periclase and spinel.

A magnesia-spinel refractory is obtained by mixing alumina granulated powder and magnesia powder, molding the resultant mixture, and then burning the molded product to form a dense and strong combined structure of periclase and spinel.

In the magnesia-spinel refractory, an alumina granulated powder is used in place of the alumina powder.

A magnesia-spinel refractory is obtained by mixing magnesia powder and alumina powder, granulating the resultant mixture, molding the granulated powder, and then burning the molded product to form a dense and strong combined structure of periclase and spinel.

A magnesia-spinel refractory is obtained by mixing magnesia granulated powder having a particle diameter of 10 to 150 $\mu$m and alumina powder having a particle size of 0.1 to 5 $\mu$m, molding the resultant mixture, and then burning the molded product to form a dense and strong combined structure of periclase and spinel.

A magnesia-spinel refractory is obtained by mixing alumina granulated powder having a particle diameter of 10 to 150 $\mu$m and magnesia powder having a particle size of 0.1 to 5 $\mu$m, molding the resultant mixture, and then burning the molded product to form a dense and strong combined structure of periclase and spinel.

In the magnesia-spinel refractory, an alumina granulated powder having a particle diameter of 10 to 150 $\mu$m is used in place of the alumina powder.

A magnesia powder for forming the magnesia granulated powder or an alumina powder for forming the alumina granulated powder has a particle diameter of 0.1 to 5 $\mu$m.

A magnesia-spinel refractory is obtained by mixing magnesia powder having a particle diameter of 0.1 to 5 $\mu$m and alumina powder having a particle diameter of 0.1 to 5 $\mu$m, granulating the resultant mixture, molding the granulated powder having a particle diameter of 10 to 150 $\mu$m, and then burning the molded product to form a dense and strong combined structure of periclase and spinel.

The granulated powder is obtained by a spray dryer method.

A hydrostatic pressing method is used as molding means.

A magnesia-spinel protecting tube comprises a burned product obtained from a mixture of magnesia and alumina.

A magnesia-spinel crucible comprises a burned product obtained from a mixture of magnesia and alumina.

The magnesia-spinel refractory is used for copper smelting and converting furnaces.

The protecting tube or crucible is used for slag of copper smelting and converting furnaces.

A method of producing a magnesia-spinel refractory comprises granulating each of a magnesia fine powder and alumina fine powder by using a spray dryer method, producing a mixture of magnesia powder and alumina granulated powder, a mixture of alumina powder and magnesia granulated powder, a granulated powder obtained by mixing a magnesia powder and alumina powder, or a granulated powder obtained by mixing a magnesia granulated powder and alumina granulated powder, molding any of the mixtures by a hydrostatic pressing method, and then burning the molded product.

The magnesia-spinel refractory of the present invention comprises a burned product of alumina and magnesia, which has a crystal structure composed of periclase having closed pores and spinel comprising a $MgO.Al_2O_3$ component, wherein the periclase crystal grain boundaries have a spinel phase, and periclase and spinel form a dense and strong combined structure. Therefore, spalling resistance is improved, and corrosion resistance and slag penetration resistance are significantly improved. Also, in the magnesia-spinel refractory obtained by mixing magnesia granulated powder and alumina powder, mixing alumina granulated powder and magnesia powder, or mixing magnesia granulated powder and alumina granulated powder, molding the resultant mixture, and then burning the molded product to form a dense and strong combined structure of periclase and spinel, spalling resistance is improved, and corrosion resistance and slag penetration resistance are significantly improved. The magnesia-spinel refractory has a dense and strong combined structure of periclase and spinel, which is obtained by mixing a magnesia powder and alumina powder, granulating the resultant mixture, molding the granulated powder, and then burning the molded product. Therefore, the corrosion resistance and slag penetration resistance are improved. Furthermore, the spray dryer method is used as the method of forming the granulated powders, thereby improving the spalling resistance and significantly improving the corrosion resistance and slag penetration resistance. Furthermore, the hydrostatic pressing method is used as molding means, thereby further improving the corrosion resistance and slag penetration resistance.

Alternatively, the magnesia-spinel refractory has a dense and strong combined structure of periclase and spinel, which is obtained by mixing a magnesia granulated powder having a particle diameter of 10 to 150 $\mu$m and alumina powder having a particle diameter of 0.1 to 5 $\mu$m, molding the resultant mixture, and then burning the molded product. Therefore, the spalling resistance is improved, and the corrosion resistance and slag penetration resistance are further improved. Also, in the magnesia-spinel refractory obtained by mixing alumina granulated powder having a particle diameter of 10 to 150 $\mu$m and magnesia powder having a particle size of 0.1 to 5 $\mu$m or mixing alumina granulated powder having a particle diameter of 10 to 150 $\mu$m and magnesia granulated powder having a particle size of 10 to 150 $\mu$m, molding the resultant mixture, and then burning the molded product to form a dense and strong combined structure of periclase and spinel, the corrosion resistance and slag penetration resistance are further improved. Since the magnesia powder for forming the magnesia granulated powder or the alumina powder for forming the alumina granulated powder has a particle diameter of 0.1 to 5 $\mu$m, the magnesia-spinel refractory has excellent corrosion resistance and slag penetration resistance. Furthermore, in the magnesia-spinel refractory obtained by mixing alumina powder having a particle diameter of 0.1 to 5 $\mu$m and magnesia powder having a particle size of 0.1 to 5 $\mu$m, granulating the resultant mixture, molding the granulated powder having a particle size of 10 to 150 $\mu$m, and then burning the molded product to form a dense and strong combined structure of periclase and spinel, the corrosion resistance and slag penetration resistance are improved.

In the use of the spray dryer method as the method of forming the granulated powders, the spalling resistance is improved, and the corrosion resistance and slag penetration resistance are most improved. In the use of the hydrostatic pressing method as molding means, the corrosion resistance and slag penetration resistance are most improved. The magnesia-spinel burned product obtained from a mixture of magnesia and alumina is suitable for use as a protecting tube or a crucible. The magnesia-spinel refractory can be suitably used for not only copper smelting and converting furnaces but also a protecting tube or crucible used for slag of the copper smelting and converting furnaces.

The method of producing a magnesia-spinel refractory of the present invention comprises granulating each of a magnesia fine powder and alumina fine powder by using a spray dryer method, producing a mixture of magnesia powder and alumina granulated powder, a mixture of alumina powder and magnesia granulated powder, a granulated powder obtained by mixing a magnesia powder and alumina powder, or a granulated powder obtained by mixing a magnesia granulated powder and alumina granulated powder, molding any of the mixtures by a hydrostatic pressing method, and then burning the molded product. Therefore, closed fine pores are distributed in the periclase crystal to improve the spalling resistance and significantly improve the corrosion resistance and slag penetration resistance.

DESCRIPTION OF THE PREFERRED EMBODIMENT

Figure 1:
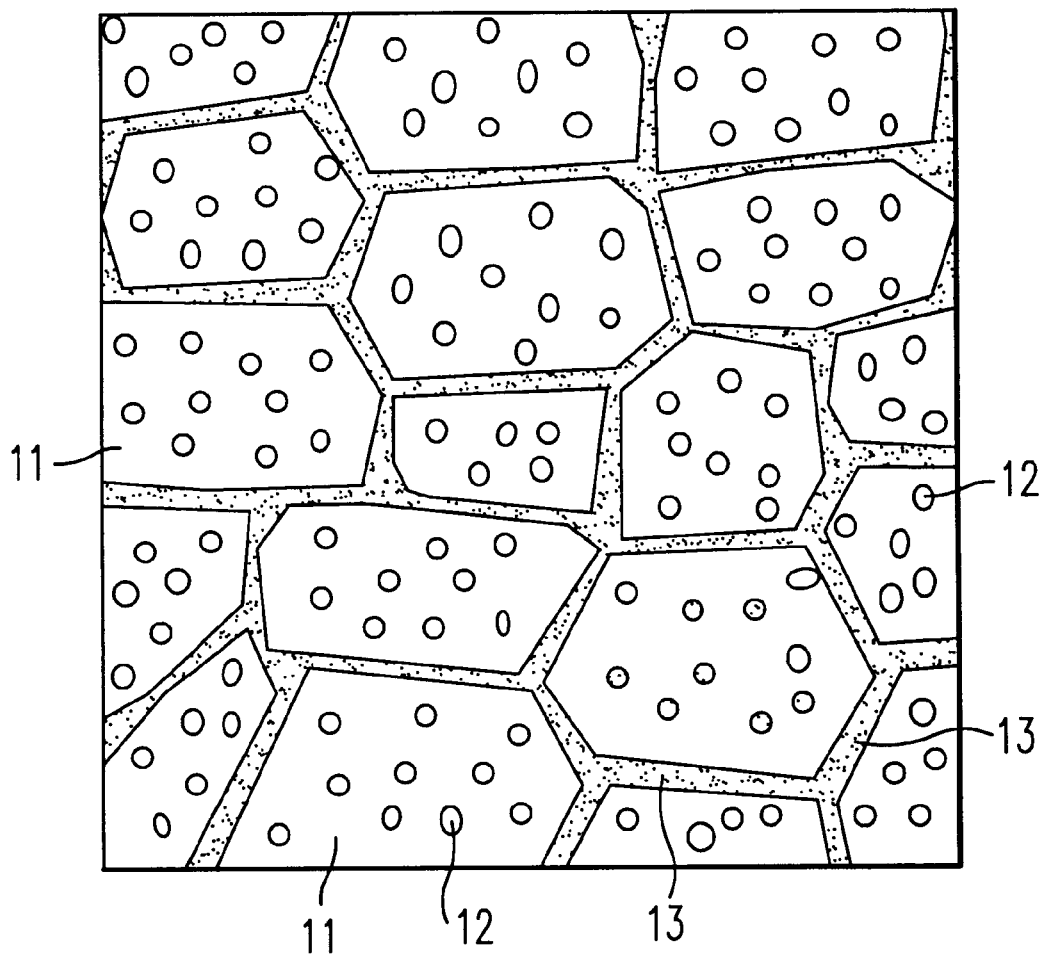
FIG. 1 is an enlarged schematic drawing showing the crystal structure of a refractory of the present invention.

Although the present invention is described in detail below, the present invention is not limited to the description below. In the present invention, magnesia and alumina are mainly used as raw materials for magnesia-spinel refractories (or ceramics), and magnesia having a particle diameter of 0.1 to 5 $\mu$m is granulated to form a magnesia granulated powder having a particle diameter of 10 to 150 $\mu$m. As the method of forming the magnesia granulated powder, the spray dryer method is preferably used because the granulated powder (uniform particle powder) obtained has a spherical shape, a sharp particle size distribution, and good fluidity. In addition, since hollow spherical particles are obtained, closed pores are produced by burning to improve the spalling resistance. Furthermore, a large amount of granulated powder can be obtained continuously from a slurry raw material, and the process is thus simple and economic.

With the magnesia granulated powder having a particle diameter of less than 10 $\mu$m, a dense strong combined structure of periclase and spinel cannot be obtained, and thus sufficient corrosion resistance and slag penetration resistance cannot be obtained. With the magnesia granulated powder having a particle diameter of over 150 $\mu$m, the porosity is increased, and thus sufficient corrosion resistance and slag penetration resistance cannot be obtained. Furthermore, a magnesia powder used for forming the magnesia granulated powder preferably has a particle diameter of 0.1 to 5 $\mu$m. With a particle diameter of less than 0.1 $\mu$m or over 5 $\mu$m, the granulated powder having a dense structure cannot be formed.

The alumina granulated powder preferably has a particle diameter of 10 to 150 $\mu$m, and like the magnesia granulated powder, the alumina granulated powder is obtained by granulation using a spray dryer. With the alumina granulated powder having a particle diameter of less than 10 μm, a dense strong combined structure of periclase and spinel cannot be obtained, and thus sufficient corrosion resistance and slag penetration resistance cannot be obtained. With the alumina granulated powder having a particle diameter of over 150 μm, the porosity is increased, and thus sufficient corrosion resistance and slag penetration resistance cannot be obtained. Furthermore, an alumina powder used for forming the alumina granulated powder preferably has a particle diameter of 0.1 to 5 μm. With a particle diameter of less than 0.1 μm or over 5 μm, the granulated powder having a dense structure cannot be formed.

In the present invention, the magnesia and alumina powders used for forming granulated powders, or the magnesia and alumina powders mixed with a granulated powder preferably have a particle diameter of 0.1 to 5 μm, preferably 0.5 to 5 μm, more preferably 1 to 2 μm. The magnesia powder having a particle diameter of less than 0.1 μm easily causes uneven distribution in mixing, while the magnesia powder having a particle diameter of over 5 μm causes deterioration in reactivity with alumina during burning. Like the magnesia powder, the alumina powder having a particle diameter of less than 0.1 μm easily causes uneven distribution in mixing, while the alumina powder having a particle diameter of over 5 μm causes deterioration in reactivity with magnesia during burning.

The magnesia powder having a particle diameter in the range of 0.5 to 5 μm causes no uneven distribution in mixing, and no deterioration in reactivity with alumina. The alumina powder having a particle diameter in the range of 0.5 to 5 μm also causes no uneven distribution in mixing, and no deterioration in reactivity with magnesia. The magnesia powder having a particle diameter in the range of 1 to 2 μm causes no uneven distribution in mixing, and no deterioration in reactivity with alumina, and is most preferred. The alumina powder having a particle diameter in the range of 1 to 2 μm also causes no uneven distribution in mixing, and substantially no deterioration in reactivity with magnesia.

The magnesia or alumina powder, and magnesia or alumina granulated powder can be used in four combinations for producing refractory products. These combinations include a mixture of magnesia powder and alumina granulated powder, a mixture of alumina powder and magnesia granulated powder, a granulated powder obtained by mixing magnesia and alumina powders, and a granulated powder obtained by mixing magnesia granulated powder and alumina granulated powder.

In producing the magnesia-spinel refractory of the present invention, magnesia and alumina are preferably used in amounts of 80 to 95% by weight and 5 to 20% by weight, respectively. Particularly, in molding the granulated powder having a particle diameter of 10 to 150 μm obtained by mixing magnesia powder having a particle diameter of 0.1 to 5 μm and alumina powder having a particle diameter of 0.1 to 5 μm, magnesia and alumina are preferably mixed in amounts of 80 to 95% by weight and 5 to 20% by weight, respectively.

The granulated powder obtained by mixing magnesia powder and alumina powder and then granulating the mixture has a particle diameter of 10 to 150 μm. In the magnesia-spinel refractory obtained by using such a granulated powder, the corrosion resistance and slag penetration resistance are significantly improved. In the present invention, in producing the magnesia granulated powder from magnesia powder, and producing the alumina granulated powder from alumina powder, of course, a binder may be added in mixing, followed by granulation.

FIG. 1 is an enlarged schematic drawing showing the crystal structure of the refractory of the present invention. In FIG. 1, the refractory of the present invention has closed pores 12 which are distributed in periclase (MgO) 11, improving the spalling resistance. The periclase has a grain diameter of 10 to 100 μm, and a uniform grain size. The closed pores have a pore diameter of 1 to 5 μm. In addition, dense and strong spinel phases 13 are formed between countless periclase crystals, and the periclase 11 is strongly bonded to the spinel 13. As a result, the corrosion resistance and slag penetration resistance are significantly improved.

Although the method of producing the magnesia-spinel refractory is not limited, an example of the method of producing the magnesia-spinel refractory comprises granulating each of a magnesia fine powder and alumina fine powder by using the spray dryer method, producing a mixture of magnesia powder and alumina granulated powder, a mixture of alumina powder and magnesia granulated powder, a granulated powder obtained by mixing a magnesia powder and alumina powder, or a granulated powder obtained by mixing a magnesia granulated powder and alumina granulated powder, molding any of the mixtures by a hydrostatic pressing method, and then burning the molded product. In further detail, the binder is added for mixing the magnesia granulated powder and alumina powder according to demand, followed by molding. The resultant molded product is burned at a temperature of 1600 to 1700° C. for 10 to 15 hours by burning means known in this technical field. The thus-obtained magnesia-spinel refractory has a dense and strong combined structure of periclase and spinel.

The magnesia-spinel refractory may be produced by mixing the magnesia granulated powder and the alumina powder, the alumina granulated powder and magnesia powder, or the alumina granulated powder and magnesia granulated powder, molding the resultant mixture, and then burning the molded product to form a dense and strong combined structure of periclase and spinel. The magnesia-spinel refractory may also be produced by mixing the magnesia powder and alumina powder, granulating the resultant mixture, molding the granulated powder, and then burning the molded product to form a dense and strong combined structure of periclase and spinel. Although, in the present invention, the raw materials can be ground and granulated by any method known in this technical field, granulation is preferably performed by using a spray dryer. For example, the spray dryer method comprises grinding raw materials such as magnesia, alumina, etc. to about 1.5 μm by a general method, adding a binder to the ground raw materials, adding alcohol or water to form a slurry, adjusting the properties (viscosity, etc.) of the slurry with a diluent, and then supplying the slurry to the spray dryer (spraying the slurry into hot air) to form spherical dry particles.

As the molding means, the hydrostatic pressing method is preferably used. The hydrostatic pressing method is a method in which a uniform pressure is applied to the whole material to be molded by using hydrostatic pressure. Specifically, a rubber mold filled with a powder is set in a container filled with a liquid, and a pressure is applied to the liquid to apply high pressure to the powder in the rubber mold by using the hydrostatic pressure of the liquid. This method produces a uniform molded product by infinite multiaxial processing, as compared with uniaxial molding using a mold.

In forming a protecting tube, a crucible, or a protecting tube or a crucible used for copper smelting and converting furnaces or copper smelting and converting furnace slag, the refractory obtained by burning a mixture of magnesia and alumina exhibits the excellent corrosion resistance and slag penetration resistance.

In the present invention, any one of a mixture of magnesia powder and alumina granulated powder, a mixture of alumina powder and magnesia granulated powder, a granulated powder obtained by mixing a magnesia powder and alumina powder, or a granulated powder obtained by mixing a magnesia granulated powder and alumina granulated powder is molded and then burned to distribute the closed fine pores in the periclase crystals, improving the spalling resistance. In addition, the spinel phases are formed in the periclase crystal grain boundaries to form the dense and strong combined structure of periclase and spinel. As a result, the corrosion resistance and slag penetration resistance are significantly improved. By using the spray dryer as the granulating means, particles having a uniform particle diameter are easily obtained. Particularly, by using magnesia or alumina powder having a particle diameter of 0.1 to 5 μm for forming the granulated powder and the spray dryer for granulation, the corrosion resistance and slag penetration resistance are further improved. Furthermore, the use of the hydrostatic pressing method as molding means produces a molded product having excellent strength and durability.

EXAMPLES

Although the present invention is described in detail below with reference to examples, the present invention is not limited to these examples.

Example 1

A magnesia-spinel refractory of the present invention was produced as follows. A magnesia powder having an average particle diameter of 1.5 μm, a binder (methyl cellulose), and an alcohol were mixed to form a dispersion, and then the dispersion was sprayed by using the spray dryer to form a magnesia granulated powder having an average particle diameter of 60 μm. Then, 90% by weight of granulated powder and 10% by weight of alumina powder having an average particle diameter of 1.5 μm were mixed, and the resultant mixture was molded under a pressure of 1.5 tf/cm$^2$ by the hydrostatic pressing method to form a molded product of 21×13×5 cm. The thus-obtained molded product was burned at a temperature of 1650° C. for 12 hours. The thus-burned product had an apparent porosity of 3.7%. The resultant refractory brick is referred to as "Sample 1".

Example 2

An alumina granulated powder having an average particle diameter of 60 μm was produced by the same method as Example 1 except that an alumina powder was used in place of the magnesia powder for forming a granulated powder. Then, 10% by weight of the alumina granulated powder and 90% by weight of the magnesia granulated powder having an average particle diameter of 60 μm obtained in Example 1 were mixed, followed by the same processing as Example 1 to produce a refractory brick. The thus-obtained refractory brick had an apparent porosity of 3.8%. The resultant refractory brick is referred to as "Sample 2".

Example 3

90% by weight of magnesia powder having an average particle diameter of 1.5 μm and 10% by weight of the same alumina powder as Example 1 having an average particle diameter of 1.5 μm were mixed, and the resultant mixture was granulated by the same method as Example 1 to obtain a granulated powder having an average particle diameter of 60 μm. A refractory brick was produced by the same processing as Example 1 except that the granulated powder obtained in this example was used. The thus-obtained refractory brick had an apparent porosity of 3.5%. The resultant refractory brick is referred to as "Sample 3".

Example 4

A granulated powder having an average particle diameter of 60 μm was produced by the same method as Example 1 except that a magnesia powder having an average particle diameter of 0.1 to 0.3 μm was used in place of the magnesia powder for forming granulated powder having an average particle diameter of 1.5 μm. Then, 90% by weight of the granulated powder having an average particle diameter of 60 μm and 10% by weight of alumina powder having an average particle diameter of 0.1 to 0.3 μm were mixed, followed by same processing as Example 1 to produce a refractory brick. The thus-obtained refractory brick had an apparent porosity of 3.3%. The resultant refractory brick is referred to as "Sample 4".

The refractory bricks of Samples 1 to 4 respectively obtained in Examples 1 to 4 were tested by using the corrosion test apparatus described below.

Figure 2:
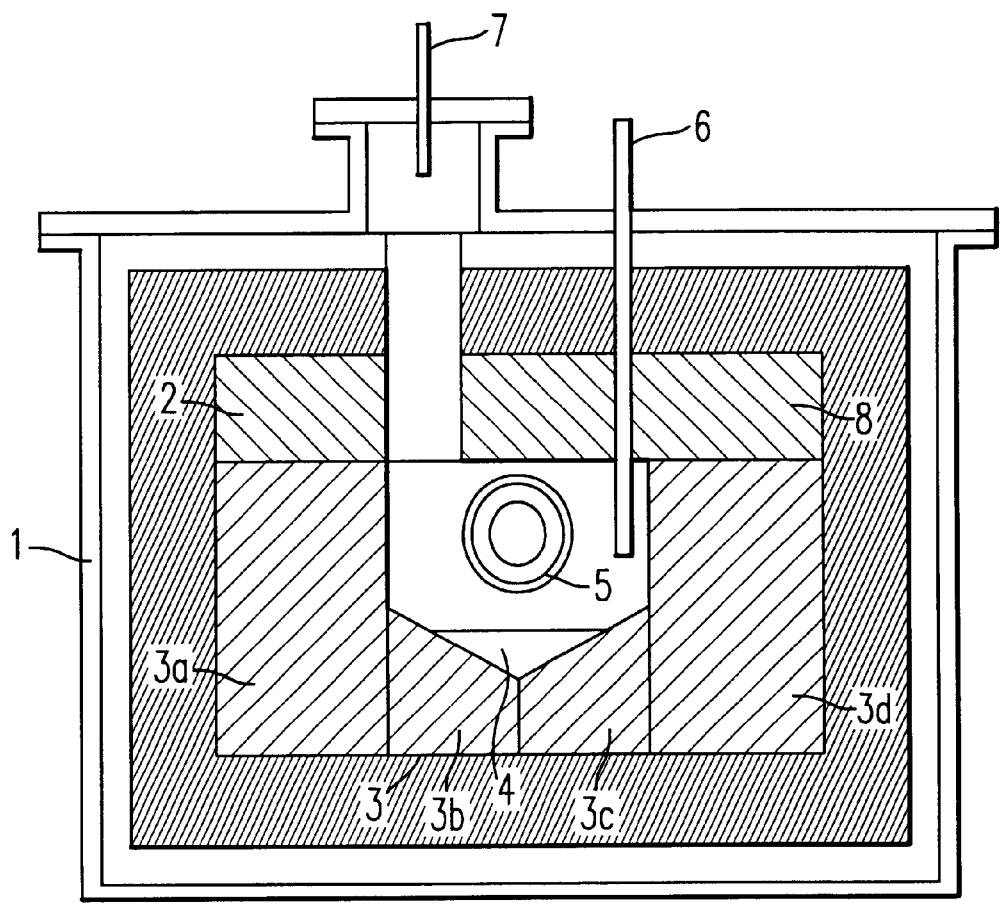
FIG. 2 is a schematic sectional view showing a corrosion test apparatus used in the present invention.

FIG. 2 shows the corrosion test apparatus used in the present invention. In FIG. 2, the inside of the corrosion test apparatus 1 is covered with heat insulating bricks, and test refractory bricks 3 of the present invention are arranged therein. The test refractory bricks 3 are arranged in the form of a container as shown by reference numerals 3a, 3b, 3c and 3d so that copper converting furnace slag (referred to as "slag" hereafter) is filled at the bottom. The upper portion is covered with a refractory brick 8, and the inside is communicated with a gas supply port 6 and a gas exhaust port 7. The corrosion test apparatus 1 has a structure which is laterally inclined, and is thus repeatedly put into a horizontal state and an inclined state.

A corrosion test was carried out at 1230° C. for 300 hours by using slag composed of CaO—Fe$_2$O$_3$—Cu$_2$O as a main component, and a commercial magnesia-spinel refractory and each of the magnesia-spinel refractory samples produced in Examples 1 to 4. In this test, the corrosion test apparatus 1 was oscillated in order to promote corrosion of the refractories by the slag. As a result, in each of the test brick samples used in the side wall, the corroded portion (shadowed portion) 9 was worn out by corrosion, as shown by a fragment 10 in FIG. 3. The results are shown in Table 1 below.

TABLE 1

| Sample | Example | | | |
| --- | --- | --- | --- | --- |
| | 1 | 2 | 3 | 4 |
| Commercial refractory brick (comparative) | | | | |
| Sectional area | 6.2 cm$^2$ | 6.0 cm$^2$ | 5.6 cm$^2$ | 5.9 cm$^2$ |
| Length of penetration | 10 mm | 12 mm | 10 mm | 12 mm |
| Refractory brick of this invention (this invention) | | | | |
| Sectional area | 2.4 cm$^2$ | 2.8 cm$^2$ | 2.5 cm$^2$ | 2.3 cm$^2$ |
| Length of penetration | 2 mm | 2 mm | 2 mm | 2 mm |

Figure 3:
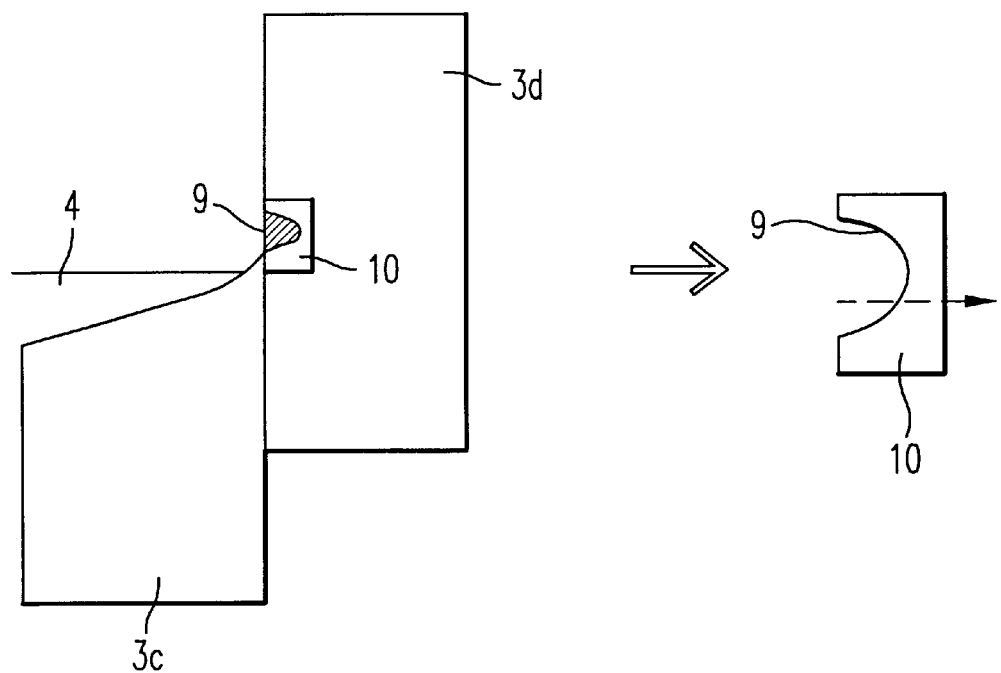
FIG. 3 is a partial sectional view showing a corroded portion.

Table 1 indicates that in Example 1, the commercial refractory brick shows a corroded portion having a cut sectional area of 6.2 cm$^2$, and a penetration length of 10 mm or more in the arrow direction shown in FIG. 3, while the refractory brick of the present invention shows a corroded portion having a cut sectional area of 2.4 cm$^2$, and a penetration length of 2 mm or less in the arrow direction shown in FIG. 3. It is thus found that the magnesia-spinel refractory of the present invention has excellent corrosion resistance to slag and excellent resistance to slag penetration into bricks, which causes structural spalling.

Example 5

(1) Protecting Tube

A protecting tube (a tube having a closed end) having an outer diameter of 21 mm, an inner diameter of 15 mm, and a length of 70 mm was produced as a comparative example by using a mixture of commercial magnesia powder and spinel powder. A protecting tube having the same shape as the comparative example was produced by using each of the mixtures of magnesia powder and alumina powder used in Examples 1 to 4 to form specimens 1 to 4 of the present invention. In a test, 160 g of copper converting furnace slag composed of CaO—Fe$_2$O$_3$—Cu$_2$O as a main component was melted at 1230° C. in a magnesia container by using an electric furnace, and each of the specimens was maintained for 5 days with an end of about 2 cm long inserted into the melt. Then, the outer diameter of each specimen was measured to measure a difference in corrosion with the melt. In addition, a section of each specimen was measured by EPMA analysis to detect the slag components Fe, Ca and Cu, and the length of slag component penetration into each protecting tube was determined.

TABLE 2

| Specimen | 1 | 2 | 3 | 4 |
|---|---|---|---|---|
| Protecting tube (comparative) | | | | |
| Maximum length of outer diameter decrease | 1.8 mm | 2.1 mm | 1.7 mm | 1.8 mm |
| Length of penetration | 1.5 mm | 1.5 mm | 1.6 mm | 1.6 mm |
| Protecting tube of this invention (this invention) | | | | |
| Maximum length of outer diameter decrease | 0.6 mm | 0.5 mm | 0.7 mm | 0.5 mm |
| Length of penetration | 0.5 mm | 0.4 mm | 0.4 mm | 0.4 mm |

Table 2 indicates that the protecting tube of the present invention has excellent corrosion resistance and penetration resistance. The protecting tube obtained by using magnesia powder and alumina granulated powder also has excellent corrosion resistance and slag penetration resistance.

(2) Crucible

A crucible having an outer diameter of 21 mm, an inner diameter of 15 mm and a length of 100 mm was produced as a comparative example by using a mixture of commercial magnesia powder and spinel powder. A crucible having the same shape as the comparative example was produced by using each of the mixtures of magnesia powder and alumina powder used in Examples 1 to 4 to form specimens 5 to 8 of the present invention. In a test, 50 g of copper converting furnace slag composed of CaO—Fe$_2$O$_3$—Cu$_2$O as a main component was placed in each of the specimens and maintained in a melt state at 1230° C. for 10 days by using an electric furnace. Then, the specimen was taken out of the electric furnace and observed. In Table 3 below, a specimen showing penetration of the slag components to the outside of the crucible is shown by x, and a specimen showing no penetration of the slag components is shown by O.

TABLE 3

| Specimen | 5 | 6 | 7 | 8 |
|---|---|---|---|---|
| Crucible (comparative) | x | x | x | x |
| Crucible (this invention) | ○ | ○ | ○ | ○ |

Table 3 indicates that the crucible of the present invention has excellent penetration resistance. The crucible obtained by using magnesia powder and alumina granulated powder also has excellent corrosion resistance and slag penetration resistance.

Example 6

Brick for Copper Smelting and Converting Furnaces

A brick for copper smelting and converting furnaces, which had a size of 21 cm×13 cm×5 cm, was produced by using a mixture of commercial magnesia powder (average particle size of 1.5 μm) and spinel powder (average particle side of 1.5 μm) to form specimen 9 of a comparative example. The refractory brick produced in Example 4 was used as specimen 10 of an example of the present invention. These specimens 9 and 10 were tested by the same corrosion test method as Example 1 using the corrosion test apparatus shown in FIG. 2. The specimen 9 of the comparative example showed a a corroded portion having a sectional area of 5.0 cm$^2$ and a length of penetration of 8 mm, while the specimen 10 of the example of the present invention showed a corroded portion having a sectional area of 2.4 cm$^2$ and a length of penetration of 2 mm. It is thus found that the specimen of the present invention has excellent resistance to penetration into a brick.

Example 7

Protecting tube for copper smelting and converting furnace slag

A protecting tube (a tube having a closed end) having an outer diameter of 21 mm, an inner diameter of 15 mm, and a length of 70 mm was produced by using a mixture of commercial magnesia powder (average particle size of 1.5 μm) and spinel powder (average particle side of 1.5 μm) to form a specimen 11 of a comparative example. Also a protecting tube having the same shape as the comparative example was produced by using the mixture of magnesia powder and alumina powder used in Example 2 to form specimen 12 of an example of the present invention. These specimens 11 and 12 were tested by the same method as the protecting tubes of Example 5 to determine the length of penetration of the slag components into the protecting tube. The specimen 11 of the comparative example showed a maximum length of outer diameter decrease of 1.5 mm and a length of penetration of 1.4 mm, while the specimen 12 of the example of the present invention showed a maximum length of outer diameter decrease of 0.6 mm and a length of penetration of 0.4 mm. It is thus found that the specimen of the present invention has excellent corrosion resistance and penetration resistance.

Example 8

Crucible for Copper Smelting and Converting Furnace Slag

A crucible having an outer diameter of 21 mm, an inner diameter of 15 mm, and a length of 100 mm was produced by using a mixture of commercial magnesia powder (average particle size of 1.5 μm) and spinel powder (average particle side of 1.5 μm) to form specimen 13 of a comparative example. A crucible having the same shape as the comparative example was also produced by using the mixture of magnesia powder and alumina powder used in Example 3 to form specimen 14 of an example of the present invention. These specimens 13 and 14 were tested by the same method as the crucibles of Example 5. Each of the specimens was taken out of the electric furnace and observed. The specimen 13 of the comparative example showed penetration of the slag components to the outside of the crucible, while the specimen 14 of the example of the present invention showed no penetration of the slag component to the outside of the crucible. It is thus found that the specimen of the present invention has excellent properties.

The magnesia-spinel refractory of the present invention comprises a burned product of alumina and magnesia, which has a crystal structure composed of periclase having closed pores and spinel comprising a $MgO.Al_2O_3$ component, wherein the periclase crystal grain boundaries have a spinel phase, and periclase and spinel form a dense and strong combined structure. Therefore, spalling resistance is improved, and corrosion resistance and slag penetration resistance are significantly improved. Also, in the magnesia-spinel refractory obtained by mixing magnesia granulated powder and alumina powder, mixing alumina granulated powder and magnesia powder, or mixing magnesia granulated powder and alumina granulated powder, molding the resultant mixture, and then burning the molded product to form a dense and strong combined structure of periclase and spinel, spalling resistance is improved, and corrosion resistance and slag penetration resistance are significantly improved. The magnesia-spinel refractory has a dense and strong combined structure of periclase and spinel, which is obtained by mixing a magnesia powder and alumina powder, granulating the resultant mixture, molding the granulated powder, and then burning the molded product. Therefore, the corrosion resistance and slag penetration resistance are improved. Furthermore, the spray dryer method is used as the method of forming the granulated powders, thereby improving the spalling resistance and significantly improving the corrosion resistance and slag penetration resistance. Furthermore, the hydrostatic pressing method is used as molding means, thereby further improving the corrosion resistance and slag penetration resistance.

Alternatively, the magnesia-spinel refractory has a dense and strong combined structure of periclase and spinel, which is obtained by mixing a magnesia granulated powder having a particle diameter of 10 to 150 $\mu$m and alumina powder having a particle diameter of 0.1 to 5 $\mu$m, molding the resultant mixture, and then burning the molded product. Therefore, the spalling resistance is improved, and the corrosion resistance and slag penetration resistance are further improved. Also, in the magnesia-spinel refractory obtained by mixing alumina granulated powder having a particle diameter of 10 to 150 $\mu$m and magnesia powder having a particle size of 0.1 to 5 $\mu$m or mixing alumina granulated powder having a particle diameter of 10 to 150 $\mu$m and magnesia granulated powder having a particle size of 10 to 150 $\mu$m, molding the resultant mixture, and then burning the molded product to form a dense and strong combined structure of periclase and spinel, the corrosion resistance and slag penetration resistance are further improved. Since the magnesia powder for forming the magnesia granulated powder or the alumina powder for forming the alumina granulated powder has a particle diameter of 0.1 to 5 $\mu$m, the magnesia-spinel refractory has excellent corrosion resistance and slag penetration resistance. Furthermore, in the magnesia-spinel refractory obtained by mixing alumina powder having a particle diameter of 0.1 to 5 $\mu$m and magnesia powder having a particle size of 0.1 to 5 $\mu$m, granulating the resultant mixture, molding the granulated powder having a particle size of 10 to 150 $\mu$m, and then burning the molded product to form a dense and strong combined structure of periclase and spinel, the corrosion resistance and slag penetration resistance are improved.

In the use of the spray dryer method as the method of forming the granulated powders, the spalling resistance is improved, and the corrosion resistance and slag penetration resistance are most improved. In the use of the hydrostatic pressing method as molding means, the corrosion resistance and slag penetration resistance are most improved. The magnesia-spinel burned product obtained from a mixture of magnesia and alumina is suitable for use as a protecting tube or a crucible. The magnesia-spinel refractory can be suitably used for not only copper smelting and converting furnaces but also a protecting tube or crucible used for slag of the copper smelting and converting furnaces.

The present invention uses the spray dryer method as the method of forming granulated powders and thus easily produces particles having a uniform size, thereby obtaining excellent corrosion resistance and slag penetration resistance. Furthermore, the present invention uses the hydrostatic pressing method as molding means and thus produces a refractory having more excellent corrosion resistance and slag penetration resistance.

What is claimed is:

1. A magnesia-spinel refractory comprising a burned product of alumina and magnesia, which has a crystal structure composed of periclase and spinel comprising a $MgO.Al_2O_3$ component, wherein the periclase crystal grain boundaries have a spinel phase, and the refractory has a porosity of 3.3 to less than 10%.

2. A magnesia-spinel refractory obtained by mixing magnesia granulated powder and alumina powder, molding the resultant mixture, and then burning the molded product, wherein the refractory has a porosity of 3.3 to less than 10%.

3. A magnesia-spinel refractory obtained by mixing alumina granulated powder and magnesia powder, molding the resultant mixture, and then burning the molded product, wherein the refractory has a porosity of 3.3 to less than 10%.

4. A magnesia-spinel refractory according to claim 2, wherein an alumina granulated powder is used in place of the alumina powder.

5. A magnesia-spinel refractory obtained by mixing magnesia powder and alumina powder, granulating the resultant mixture, molding the granulated powder, and then burning the molded product, wherein the refractory has a porosity of 3.3 to less than 10%.

6. A magnesia-spinel refractory obtained by mixing magnesia granulated powder having a particle diameter of 10 to 150 $\mu$m and alumina powder having a particle size of 0.1 to 5 $\mu$m, molding the resultant mixture, and then burning the molded product, wherein the refractory has a porosity of 3.3 to less than 1 0%.

7. A magnesia-spinel refractory obtained by mixing alumina granulated powder having a particle diameter of 10 to 150 $\mu$m and magnesia powder having a particle size of 0.1 to 5 $\mu$m, molding the resultant mixture, and then burning the molded product wherein the refractory has a porosity of 3.3 to less than 10%.

8. A magnesia-spinel refractory according to claim 6, wherein an alumina granulated powder having a particle diameter of 10 to 150 $\mu$m is used in place of the alumina powder.

9. A magnesia-spinel refractory according to any one of claims 6 to 8, wherein a magnesia powder for forming the magnesia granulated powder or an alumina powder for forming the alumina granulated powder has a particle diameter of 0.1 to 5 μm.

10. A magnesia-spinel refractory obtained by mixing magnesia powder having a particle diameter of 0.1 to 5 μm and alumina powder having a particle diameter of 0.1 to 5 μm, granulating the resultant mixture, molding the granulated powder having a particle diameter of 10 to 150 μm, and then burning the molded product, wherein the refractory has a porosity of 3.3 to less than 10%.

11. A magnesia-spinel refractory according to any one of claims 2 to 8 and 10, wherein the granulated powder is obtained by a spray dryer method.

12. A magnesia-spinel refractory according to any one of claims 2 to 8 and 10, wherein the molding comprises hydrostatic pressing.

13. A magnesia-spinel protecting tube comprising the refractor any one of claims 1 to 8 and 10.

14. A magnesia-spinel crucible comprising the refractor any one of claims 1 to 8 and 10.

15. A method of using a magnesia-spinel refractory, the method comprising forming a furnace including the refractory of claim 6, 7, 8 or 10; smelting copper.

16. A method of using a magnesia-spinel refractory method comprising forming a protecting tube or crucible comprising the refractory of claim 6, 7, 8 or 10; and smelting copper.

17. A method of producing a magnesia-spinel refractory comprising granulating each of a magnesia fine powder and alumina fine powder by using a spray dryer method, producing a mixture of magnesia powder and alumina granulated powder, a mixture of alumina powder and magnesia granulated powder, a granulated powder obtained by mixing a magnesia powder and alumina powder, or a granulated powder obtained by mixing a magnesia granulated powder and alumina granulated powder, molding any of the mixtures by a hydrostatic pressing method, and then burning the molded product, wherein the refractory has a porosity of 3.3 to less than 10%.

18. A magnesia-spinel refractory according to claim 1, wherein the refractory has a porosity of 3.3 to 3.8%.

19. A magnesia-spinel refractory according to claim 2, wherein the refractory has a porosity of 3.3 to 3.8%.

20. A magnesia-spinel refractory according to claim 3, wherein the refractory has a porosity of 3.3 to 3.8%.

21. A magnesia-spinel refractory according to claim 5, wherein the refractory has a porosity of 3.3 to 3.8%.

22. A magnesia-spinel refractory according to claim 6, wherein the refractory has a porosity of 3.3 to 3.8%.

23. A magnesia-spinel refractory according to claim 7, wherein the refractory has a porosity of 3.3 to 3.8%.

24. A magnesia-spinel refractory according to claim 10, wherein the refractory has a porosity of 3.3 to 3.8%.

25. A method according to claim 17, wherein the refractory has a porosity of 3.3 to 3.8%.

\* \* \* \* \*